United States Patent
Lee et al.

(10) Patent No.: US 9,820,306 B2
(45) Date of Patent: Nov. 14, 2017

(54) APPARATUSES, SYSTEMS, AND METHODS FOR ACCESS CONFIGURATIONS

(71) Applicant: Intel Corporation, Santa Clara, CA (US)

(72) Inventors: Anthony Lee, San Diego, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 14/980,143

(22) Filed: Dec. 28, 2015

(65) Prior Publication Data

US 2016/0135228 A1 May 12, 2016

Related U.S. Application Data

(63) Continuation of application No. 14/025,364, filed on Sep. 12, 2013, now Pat. No. 9,253,800.

(60) Provisional application No. 61/713,366, filed on Oct. 12, 2012, provisional application No. 61/702,068, filed on Sep. 17, 2012.

(51) Int. Cl.
*G01R 31/08* (2006.01)
*H04W 74/08* (2009.01)
*H04W 48/16* (2009.01)

(52) U.S. Cl.
CPC ....... *H04W 74/0833* (2013.01); *H04W 48/16* (2013.01)

(58) Field of Classification Search
CPC .......................... H04W 74/0833; H04W 48/16
See application file for complete search history.

(56) References Cited

U.S. PATENT DOCUMENTS 6,721,281 B1 *   4/2004   Dick ................... H04W 74/006
                                          370/252
8,020,009 B2 *   9/2011   Wertheimer ........ H04L 12/2602
                                          709/227

(Continued)

OTHER PUBLICATIONS

"Upper Layer (Layer 3) Signaling Standard for cdma2000 Spread Spectrum Systems", 3GPP2 C.S0005-F v2.0; 3ed Generation Partnership Project 2 "3GPP2", pp. 1-2406, May 2014.

(Continued)

*Primary Examiner* — Robert Wilson
(74) *Attorney, Agent, or Firm* — Schiff Hardin LLP (57) ABSTRACT

A mobile communication device including a wireless module and a controller module is provided, and the mobile communication device is coupled to a cellular access station. The wireless module performs wireless transmissions and receptions to and from the cellular access station. The controller module determines whether a GAPM has been received from the cellular access station via the wireless module and whether the mobile communication device supports an EACH, and if so, performs Tx operations on the EACH using a random access procedure with a message duration, and otherwise, if not, performs the Tx operations on an ACH using the random access procedure. Particularly, the GAPM includes a maximum message duration and a minimum message duration over the EACH, and the message duration is not greater than the maximum message duration and not less than the minimum message duration over the EACH.

14 Claims, 5 Drawing Sheets

(56) References Cited

U.S. PATENT DOCUMENTS

| | | | |
|---|---|---|---|
| 8,942,254 B2* | 1/2015 | Won | H04W 72/087 |
| | | | 370/465 |
| 9,253,800 B2* | 2/2016 | Lee | H04W 48/16 |
| 9,294,355 B2* | 3/2016 | Edwards | H04L 41/083 |
| 2003/0117958 A1* | 6/2003 | Nation | H04L 47/10 |
| | | | 370/235 |
| 2003/0129988 A1* | 7/2003 | Lee | H04W 28/16 |
| | | | 455/450 |
| 2003/0133409 A1* | 7/2003 | Corazza | H04L 1/0002 |
| | | | 370/230 |
| 2005/0181729 A1* | 8/2005 | Ibrahim | H03J 7/02 |
| | | | 455/41.2 |
| 2005/0239440 A1 | 10/2005 | Chen et al. | |
| 2007/0239862 A1* | 10/2007 | Bronez | H04L 12/24 |
| | | | 709/223 |
| 2007/0286081 A1* | 12/2007 | Corazza | H04L 1/0002 |
| | | | 370/236 |
| 2008/0002761 A1* | 1/2008 | Edsall | H04B 10/07953 |
| | | | 375/222 |
| 2008/0144499 A1* | 6/2008 | Adhikari | H04L 47/10 |
| | | | 370/232 |
| 2008/0298447 A1* | 12/2008 | Yoo | H04W 28/22 |
| | | | 375/225 |
| 2012/0108250 A1* | 5/2012 | Ahn | H04L 1/0002 |
| | | | 455/450 |
| 2012/0127874 A1 | 5/2012 | Oh et al. | |
| 2013/0041981 A1* | 2/2013 | Kim | H04W 48/16 |
| | | | 709/217 |
| 2013/0156049 A1 | 6/2013 | Calvarese et al. | |
| 2013/0250867 A1 | 9/2013 | Patwardhan et al. | |
| 2014/0078984 A1* | 3/2014 | Lee | H04W 74/0833 |
| | | | 370/329 |
| 2014/0192659 A1* | 7/2014 | Tian | H04W 72/0453 |
| | | | 370/252 |
| 2015/0023166 A1* | 1/2015 | Kim | H04W 74/006 |
| | | | 370/230 |
| 2015/0245319 A1* | 8/2015 | Wentink | H04L 5/0055 |
| | | | 370/329 |
| 2016/0029292 A1* | 1/2016 | Lynn, Jr. | H04W 48/02 |
| | | | 370/329 |
| 2016/0381691 A1* | 12/2016 | Panchal | H04W 24/10 |
| | | | 370/329 |

OTHER PUBLICATIONS

"Medium Access Control (MAC) Standard for cdma2000 Spread Spectrum Systems", 3GPP2 C.S0003-F v1.0; 3rd Generation Partnership 2 "3GPP2", pp. 1-333, Dec. 2012.

* cited by examiner

APPARATUSES, SYSTEMS, AND METHODS FOR ACCESS CONFIGURATIONS

CROSS REFERENCE TO RELATED APPLICATIONS

This application claims the benefit of U.S. Provisional Application No. 61/702,068, filed on Sep. 17, 2012, and now U.S. Pat. No. 9,235,800, the entirety of which is incorporated by reference herein. This application claims the benefit of U.S. Provisional Applications No. 61/713,366, filed on Oct. 12, 2012, the entirety of which is incorporated by reference herein.

BACKGROUND OF THE INVENTION

Field of the Invention

The invention generally relates to control signaling over access channels in mobile communication environments, and more particularly, to access configurations of a mobile communication device towards a cellular access station over an Enhanced Access Channel (EACH).

Description of the Related Art

With growing demand for ubiquitous computing and networking, various wireless technologies have been developed, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, 1× High Rate Packet Data (1×HRPD) technology, Time Division-Synchronous Code Division Multiple Access (TD-SCDMA) technology, Worldwide Interoperability for Microwave Access (WiMAX) technology, Long Term Evolution (LTE) technology, and Time-Division LTE (TD-LTE) technology, etc.

Take the CDMA2000 1× Evolution-Data Optimized (EV-DO) Revision F (or called 1× EV-DO Rev F) technology as an example. When a Mobile Station (MS) (or called User Equipment (UE)) attempts to access a base station, it has to transmit an access request on the Access Channel (ACH) (or called Reverse ACH (R-ACH)) or on the EACH (or called Reverse EACH (R-EACH)). The EACH is similar to the ACH in that the MS's Transmission (Tx) operations on the EACH are randomized to avoid collisions with other MSs' Tx operations on the same channel. The EACH has been further improved, having lower probability of collisions, as the message durations of the MS's Tx operations on the EACH are typically shorter than the message durations of the MS's Tx operations on the ACH. The EACH can be used in different access modes, including a basic access mode and a reservation access mode. For transmission of the access request on the EACH, the MS must determine which access mode and what data rate to use. However, according to the 3GPP2 C.S0003 and C.S0005 Rev F specifications, the base station does not provide sufficient EACH related parameters to the MS for assisting with access mode selection and data rate determination. As a result, the MS's Tx operations on the EACH would be impaired.

BRIEF SUMMARY OF THE INVENTION

In order to solve the aforementioned problem, the invention proposes to include a maximum message duration and a minimum message duration over the EACH in a Generic Access Parameters Message (GAPM), so that the MS may correctly select an access mode and determine the data rate to use according to the received GAPM.

In one aspect of the invention, a mobile communication device coupled to a cellular access station is provided. The mobile communication device comprises a wireless module and a controller module. The wireless module performs wireless transmissions and receptions to and from the cellular access station. The controller module determines whether a GAPM has been received from the cellular access station via the wireless module and whether the mobile communication device supports an EACH, and performs Tx operations on an ACH using a random access procedure when the GAPM has not been received or the mobile communication device does not support the EACH, and performs the Tx operations on the EACH using the random access procedure with a message duration when the GAPM has been received and the mobile communication device supports the EACH, wherein the GAPM comprises a maximum message duration over the EACH and a minimum message duration over the EACH, and the message duration is not greater than the maximum message duration over the EACH and not less than the minimum message duration over the EACH.

In another aspect of the invention, a method for access configurations by a mobile communication device in communications with a cellular access station is provided. The method comprises the steps of: determining whether a GAPM has been received from the cellular access station and whether the mobile communication device supports an EACH, wherein the GAPM comprises a maximum message duration over the EACH and a minimum message duration over the EACH; performing Tx operations on an ACH using a random access procedure when the GAPM has not been received or the mobile communication device does not support the EACH, and performing the Tx operations on the EACH using the random access procedure with a message duration when the GAPM has been received and the mobile communication device supports the EACH, wherein the message duration is not greater than the maximum message duration over the EACH and not less than the minimum message duration over the EACH.

In yet another aspect of the invention, a cellular access station coupled to a mobile communication device is provided. The cellular access station comprises a wireless module and a controller module. The wireless module performs wireless transmissions and receptions to and from the mobile communication device supporting an EACH. The controller module broadcasts, via the wireless module, a GAPM comprising a maximum message duration over the EACH and a minimum message duration over the EACH, so as to configure the mobile communication device to perform Tx operations on the EACH using a random access procedure with a message duration which is not greater than the maximum message duration over the EACH and not less than the minimum message duration over the EACH.

In still another aspect of the invention, a method for access configurations between a mobile communication device and a cellular access station is provided. The method comprises the steps of: providing the mobile communication device which supports an EACH and is in communications with the cellular access station; and broadcasting, by the cellular access station, a GAPM comprising a maximum message duration over the EACH and a minimum message duration over the EACH, so as to configure the mobile communication device to perform Tx operations on the EACH using a random access procedure with a message duration which is not greater than the maximum message duration over the EACH and not less than the minimum message duration over the EACH.

Other aspects and features of the invention will become apparent to those with ordinary skill in the art upon review of the following descriptions of specific embodiments of the mobile communication device, the cellular access station, and the method for access configurations.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. The 3GPP2 specifications described herein are used to teach the spirit of the invention, and the invention is not limited thereto.

Figure 1:
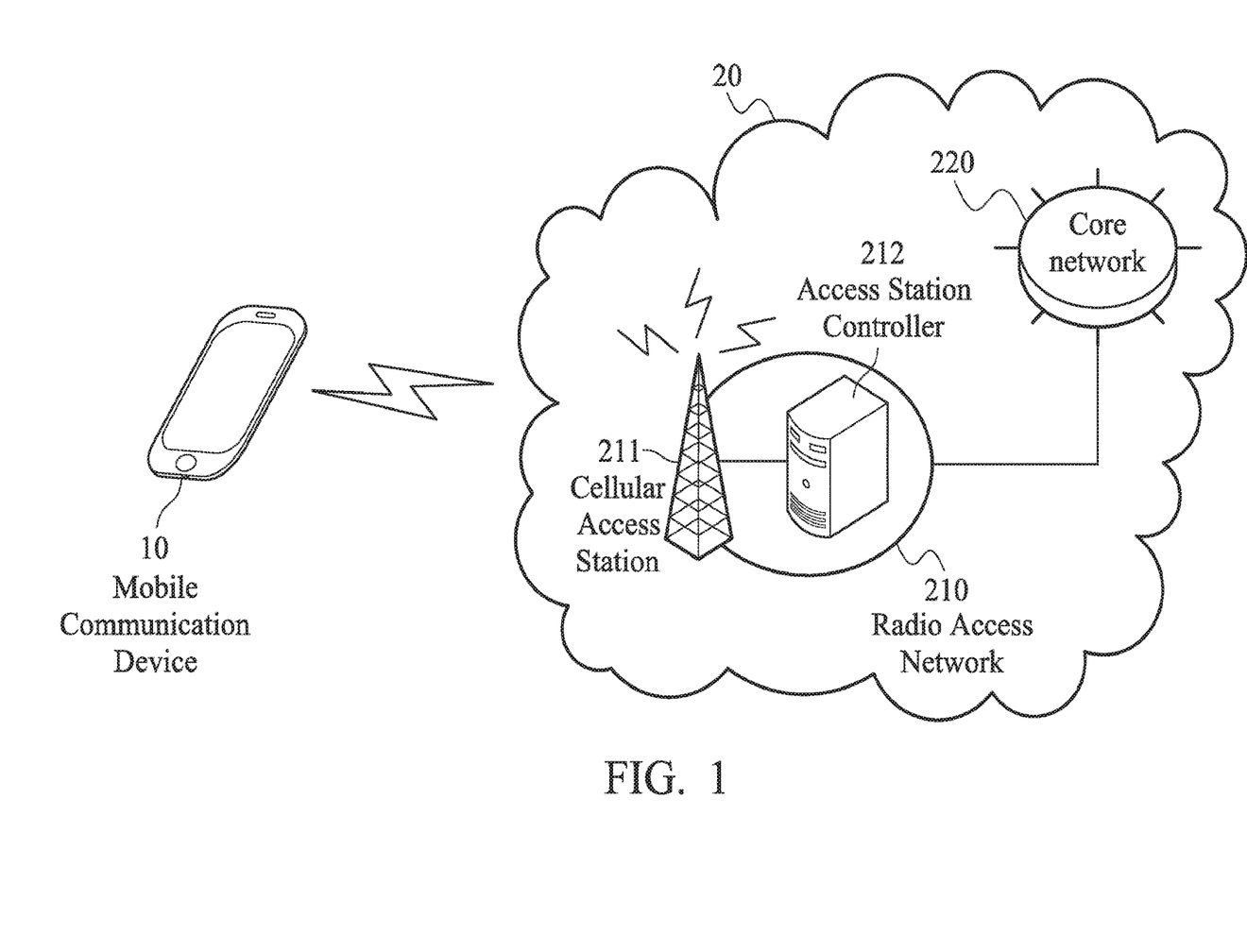
FIG. 1 is a block diagram illustrating a mobile communication environment according to an embodiment of the invention.

FIG. 1 is a block diagram illustrating a mobile communication environment according to an embodiment of the invention. In the mobile communication environment, the mobile communication device 10 wirelessly communicates with the service network 20 via an air interface. The mobile communication device 10 may be a smart phone, a panel computer, a Personal Computer (PC), a laptop computer, or any computing device supporting at least the wireless technology utilized by the service network 20. In one embodiment, the mobile communication device 10 may be configured as a Machine-to-Machine (M2M) device for M2M communications. In another embodiment, the mobile communication device may be a normal device, i.e., a non-M2M device, for non-M2M communications, such as voice and/or data services. The service network 20 comprises a radio access network 210 and a core network 220, wherein the radio access network 210 is responsible for processing radio signals, terminating radio protocols, and connecting the mobile communication device 10 with the core network 220. The radio access network 210 comprises at least a cellular access station 211 and an access station controller 212. The cellular access station 211 is controlled by the access station controller 212 and is responsible for providing wireless transceiving functionality for the service network 20. Specifically, the cellular access station 211 generally serves one cell or multiple logical sectors. The access station controller 212 is responsible for controlling the operation of the cellular access station 211, i.e., managing radio resources, radio parameters, and interfaces for the cellular access station 211. The core network 220 is responsible for performing mobility management, network-side authentication, and interfaces with public networks.

In one embodiment, the service network 20 may be a CDMA2000 system, including 1× Radio Transmission Technology (RTT), 1× EV-DO Release 0/A/B/C, and 1× EV-DO Rev D/E/F. The cellular access station 211 may be a Base Transceiver Station (BTS), and the access station controller 212 may be a Base Station Controller (BSC). The core network 220 may comprise a Circuit-Switched (CS) domain and a Packet-Switched (PS) domain, wherein the CS domain may comprise several network entities, such as a Mobile Switching Center emulation (MSCe), Media Gateway (MGW), Media Resource Function Processor (MRFP), Signaling Gateway (SGW), Service Control Point emulation (SCPe), and Home Location Register emulation (HLRe), and the PS domain may comprise a Packet Data Service Node (PDSN) and Authentication Authorization Accounting (AAA) servers. It is to be understood that, the 1×CDMA2000 system is merely an illustrative example, and other wireless communication networks utilizing any future technology of the 1×CDMA2000 technology family may be used instead, and the invention is not limited thereto.

Figure 2:
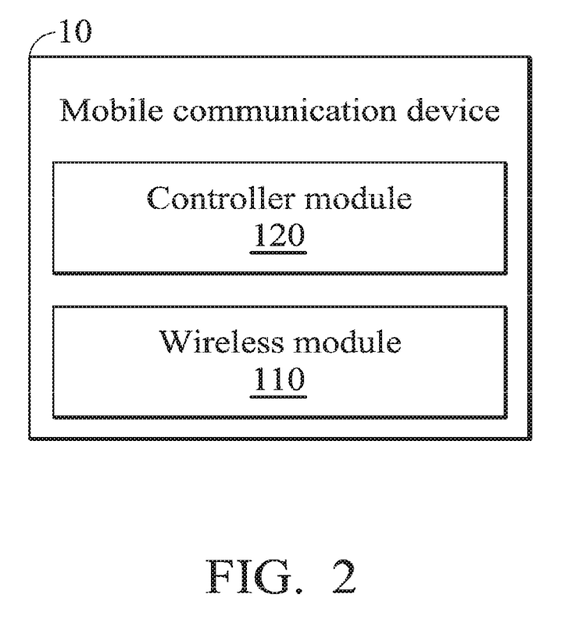
FIG. 2 is a block diagram illustrating the mobile communication device 10 according to an embodiment of the invention.

FIG. 2 is a block diagram illustrating the mobile communication device 10 according to an embodiment of the invention. The mobile communication device 10 comprises a wireless module 110 and a controller module 120, wherein the wireless module 110 is configured to perform the functionality of wireless transceiving and the controller module 120 is configured to control the operation of the wireless module 110 for performing the method for access configurations over the EACH in the present invention. To further clarify, the wireless module 110 may comprise a Radio Frequency (RF) unit, and the controller module 120 may comprise a general-purpose processor or Micro-Control Unit (MCU) of a baseband unit (or called a baseband processor). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 800 MHz, 1900 MHz, or 2400 MHz utilized in 1×CDMA2000 technology, or others depending on the wireless technology in use. Although not shown, the mobile communication device 10 may further comprise other functional components, such as a display unit and/or keypad serving as the Man-Machine Interface (MMI), a storage unit storing the program codes of applications and/or communication protocol(s), or others.

Similarly, the cellular access station 211 may comprise a wireless module (not shown) and a controller module (not shown), wherein the wireless module is configured to perform the functionality of wireless transceiving and the controller module is configured to control the operation of the wireless module for performing the method for access configurations over the EACH in the present invention. Regarding detailed description of the wireless module and the controller module in similarity, reference may be made to the embodiment of FIG. 2.

Figure 3:
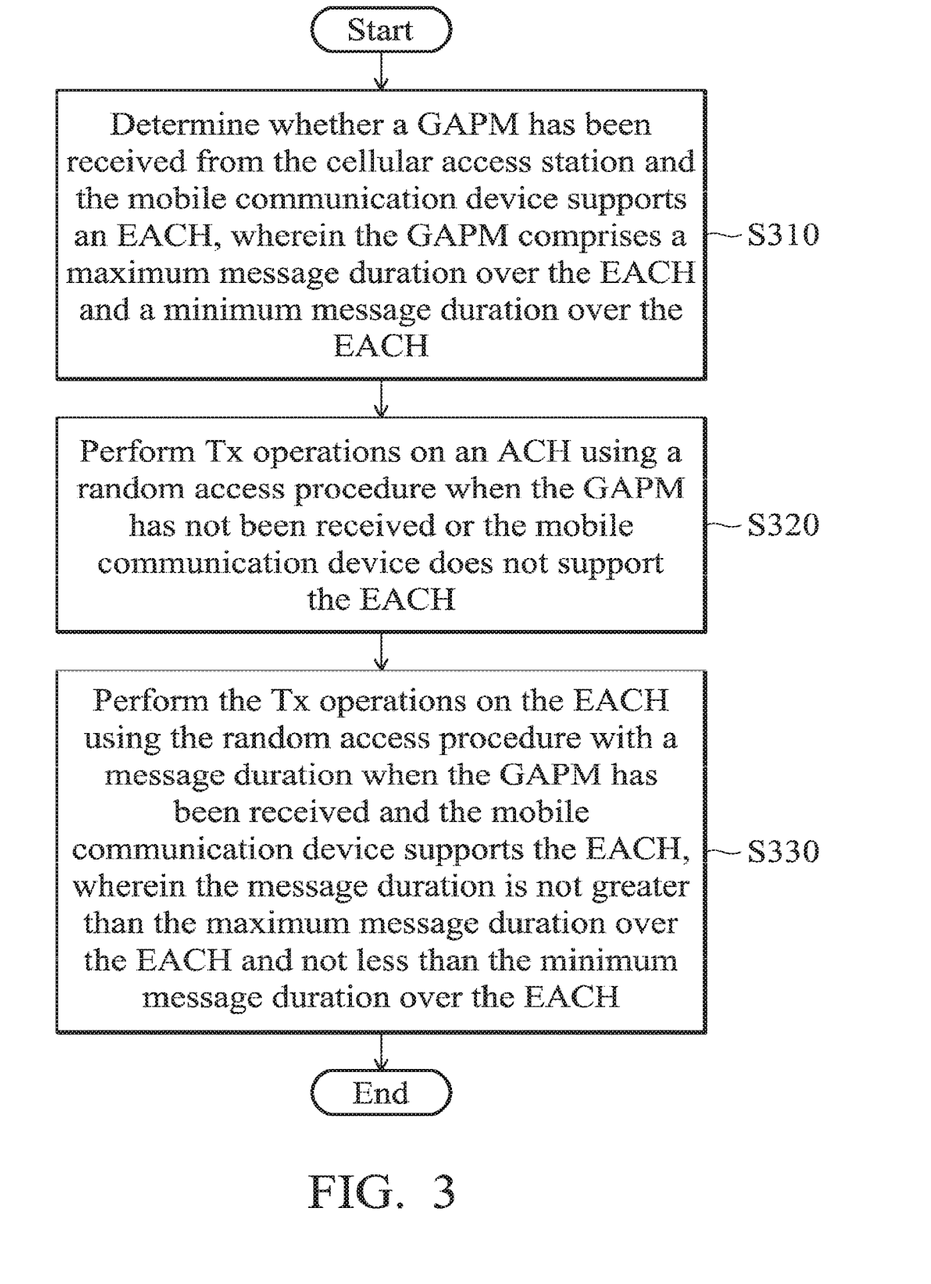
FIG. 3 is a flow chart illustrating the method for access configurations by a mobile communication device in communications with a cellular access station according to an embodiment of the invention.

FIG. 3 is a flow chart illustrating the method for access configurations by a mobile communication device in communications with a cellular access station according to an embodiment of the invention. To begin, the mobile communication device determines whether a GAPM has been received from the cellular access station and whether the mobile communication device supports an EACH, wherein the GAPM comprises a maximum message duration over the EACH and a minimum message duration over the EACH (step S310). Next, the mobile communication device performs Tx operations on an ACH using a random access procedure when the GAPM has not been received or the mobile communication device does not support the EACH (step S320), and the mobile communication device performs the Tx operations on the EACH using the random access procedure with a message duration when the GAPM has been received and the mobile communication device supports the EACH, wherein the message duration is not greater than the maximum message duration over the EACH and not less than the minimum message duration over the EACH (step S330). In one embodiment, both of the mobile communication device and the cellular access station operate in compliance with the communication protocol of the 1× EV-DO Rev F technology.

Figure 4:
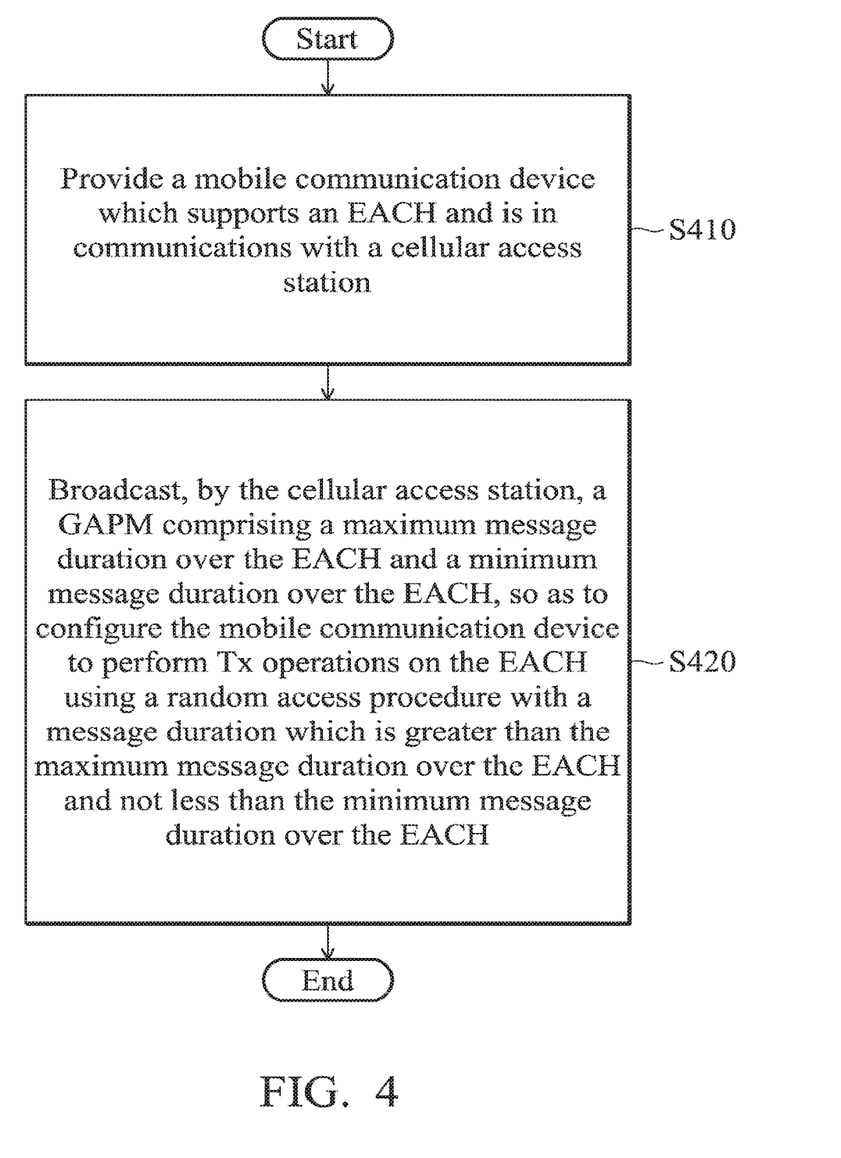
FIG. 4 is a flow chart illustrating the method for access configurations of a mobile communication device according to an embodiment of the invention.

FIG. 4 is a flow chart illustrating the method for access configurations between a mobile communication device and a cellular access station according to an embodiment of the invention. To begin, a mobile communication device is provided, which supports an EACH and is in communications with a cellular access station (step S410). Next, the cellular access station broadcasts a GAPM comprising a maximum message duration over the EACH and a minimum message duration over the EACH, so as to configure the mobile communication device to perform Tx operations on the EACH using a random access procedure with a message duration which is not greater than the maximum message duration over the EACH and not less than the minimum message duration over the EACH (step S420). In one embodiment, both of the mobile communication device and the cellular access station operate in compliance with the communication protocol of the 1× EV-DO Rev F technology.

Figure 5:
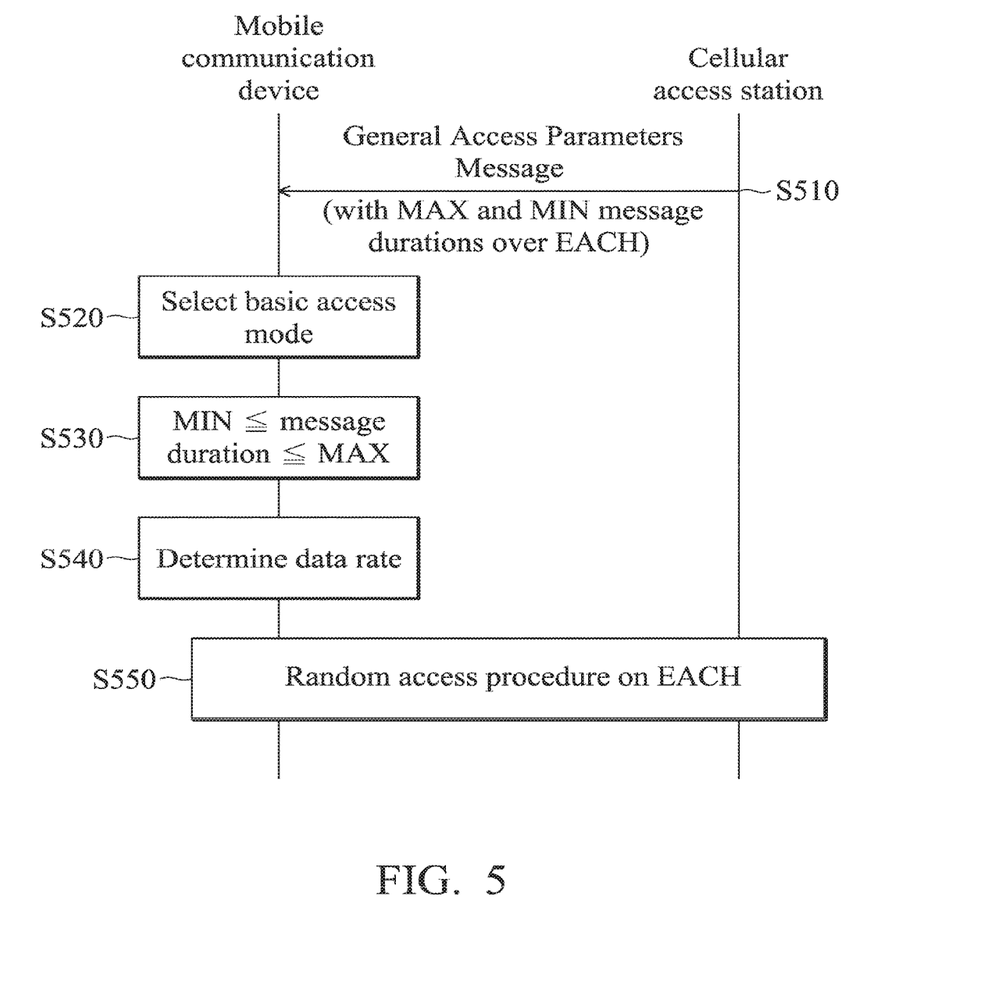
FIG. 5 is a message sequence chart illustrating access configurations of a mobile communication device according to an embodiment of the invention.

FIG. 5 is a message sequence chart illustrating access configurations between a mobile communication device and a cellular access station according to an embodiment of the invention. In this embodiment, the mobile communication device is configured as an M2M device supporting the EACH. At first, the cellular access station broadcasts a GAPM which comprises EACH related parameters, particularly including a maximum message duration over the EACH and a minimum message duration over the EACH (step S510). An exemplary data format of the GAPM is given below.

TABLE 1

| . | . |
|---|---|
| . | . |
| . | . |
| LOW_RATE_EACH_SUPPORT | 1 |
| SACK_SUPPORTED_INDICATOR | 1 |
| EACH_MAX_DURATION | 10 |
| EACH_MIN_DURATION | 10 |
| RESERVED | 0-7 (as needed) |

It is noted that, unlike conventional data format of the GAPM, the GAPM in the present application, as shown in Table 1, additionally comprises the "EACH_MAX_DURATION" field and the "EACH_MIN_DURATION" field for indicating the maximum and minimum message duration over the RACH, in units of 5 ms, 10 ms, or others. It is to be understood that, the naming of the "EACH_MAX_DURATION" and "EACH_MIN_DURATION" fields is merely an illustrative example, and the invention is not limited thereto. Descriptions of the other data fields in the GAPM are omitted herein as they are beyond the scope of the invention, and reference thereof may be made to the 3GPP2 C.S0005 Rev F specification.

Subsequently, upon receiving the GAPM, the mobile communication device selects the basic access mode for a random access procedure which is to be used for performing Tx operations on the EACH (step S520). Specifically, the mobile communication device may set a flag "GAPM_IN_USEs", which is used in the Layer 3 of the communication protocol in use between the mobile communication device and the cellular access station, to a first value (e.g., TRUE) for indicating that the GAPM has been received and that the mobile communication device supports the EACH. In response to the flag "GAPM_IN_USEs" being set to the first value, the mobile communication device may determine to use the basic access mode for the random access procedure. Otherwise, the mobile communication device may set the flag "GAPM_IN_USEs" to a second value (e.g. FALSE) when no GAPM has been received or the mobile communication device does not support the EACH. For example, the flag "GAPM_IN_USEs" may be a Boolean type of data.

Next, the mobile communication device determines a message duration for the Tx operations on the EACH, which is not greater than the maximum message duration over the EACH and not less than the minimum message duration over the EACH (step S530), and determines a lowest data rate for the Tx operations on the EACH, which fulfills the message duration, when the mobile communication device is configured as an M2M device (step S540). After that, the mobile communication device performs the random access procedure on the EACH (step S550). That is, the mobile communication device performs the Tx operations on the EACH using the random access procedure.

In one embodiment, the access mode selection, and the message duration and data rate determination may be performed in the MAC layer of the communication protocol in use between the mobile communication device and the cellular access station. Specifically, an enhanced access mode selection algorithm may be provided for this purpose to the Signaling Radio Burst Protocol (SRBP) entity in the MAC layer. An example of such an algorithm is written in pseudo-code as given below.

```
Access_Mode (size) //size represents the data size to be transmitted
{
  ACC_MODES_s = INVALID;
  ACC_RATES_s = INVALID;
  ACC_NUM_BITS_s = INVALID;
  ACC_FRAME_DURATIONS_s = INVALID;
  ACC_MAX_DURATION_s = INVALID;
  ACC_MIN_RATE_s = INVALID;
  ACC_MSG_SIZE_s = INVALID;
  EACH_NOM_PWR_s = INVALID;
  EACH_INIT_PWR_s = INVALID;
  EACH_PREAMBLE_ENABLED_s = INVALID;
  EACH_PREAMBLE_NUM_FRAC_s = INVALID;
  EACH_PREAMBLE_FRAC_DURATION_s = INVALID;
  EACH_PREAMBLE_OFF_DURATION_s = INVALID;
  NUM_STEP_s = INVALID;
  EACH_BKOFF_s = INVALID;
  EACH_PROBE_BKOFF_s = INVALID;
  EACH_SLOT_s = INVALID;
  Let each_rates be the set of R-EACH transmission rates (in bps) with the
     corresponding bit position in EACH_BA_RATES_SUPPORTED_s, as specified in
     Table 2-41, set to 1; //Table 2-41 may be referred to the 3GPP2 C.S0003 Rev F
     specification
  Let rccch_rates be the set of R-CCCH transmission rates (in bps) with the
     corresponding bit position in RCCCH_RATES_SUPPORTED_s, as specified in Table
     2-41, set to 1; //Table 2-41 may be referred to the 3GPP2 C.S0003 Rev F
     specification
  if (GAPM_IN_USEs==true)
  {
     // d is the duration of the message at rate r in units of 5 ms
     Let r be the desired transmission rate on the R-EACH such that:
         r is a member of the set each_rates,
         d = ⌈1000 × size/r/5⌉, and
         (d >= EACH_MIN_DURATION) && (d <= EACH_MAX_DURATION);
     If the device is a delay tolerant device, r should be the lowest rate which fulfils the
         condition above. Otherwise, r should be the highest rate which fulfils the condition
         above.
     if (an acceptable value for r exists)
     {
         ACC_MODE_s = '000';
         ACC_RATE_s = r;
         ACC_NUM_BITS_s = the number of information bits that corresponds to r
             according to Table 2-43; //Table 2-41 may be referred to the 3GPP2 C.S0003
             Rev F specification
         ACC_FRAME_DURATIONS_s = the frame duration that corresponds to r according
             to Table 2-43; //Table 2-41 may be referred to the 3GPP2 C.S0003 Rev F
             specification
         ACC_MAX_DURATION_s = EACH_MAX_DURATION;
         ACC_MIN_RATE_s = the minimum rate the mobile station supports
             that is greater than or equal to (size/ (EACH_MAX_DURATION × 5));
         ACC_MSG_SIZE = size;
         EACH_NOM_PWR_s= MODE_PARMS_s[ACC_MODE_s].EACH_NOM_PWR;
         EACH_INIT_PWR_s=MODE_PARMS_s[ACC_MODE_s].EACH_INIT_PWR;
         EACH_PREAMBLE_ENABLED_s=MODE_PARMS_s[ACC_MODE_s].
             EACH_PREAMBLE_ENABLED;
         EACH_PREAMBLE_NUM_FRAC_s=MODE_PARMS_s[ACC_MODE_s].
             EACH_PREAMBLE_NUM_FRAC;
         EACH_PREAMBLE_FRAC_DURATION_s=
             MODE_PARMS_s[ACC_MODE_s].EACH_PREAMBLE_FRAC_DURATION;
         EACH_PREAMBLE_OFF_DURATION_s=
             MODE_PARMS_s[ACC_MODE_s].EACH_PREAMBLE_OFF_DURATION;
         NUM_STEP_s=MODE_PARMS_s[ACC_MODE_s].EACH_NUM_STEP;
         EACH_BKOFF_s=MODE_PARMS_s[ACC_MODE_s].EACH_BKOFF;
         EACH_PROBE_BKOFF_s=
             MODE_PARMS_s[ACC_MODE_s].EACH_PROBE_BKOFF;
         EACH_SLOT_s=MODE_PARMS_s[ACC_MODE_s].EACH_SLOT;
         ACC_RESIDUAL_SIZE_s=ACC_RATE_s×ACC_FRAME_DURATION_s×
             ⌊(ACC_MAX_DURATION_s×5)/ACC_FRAME_DURATION_s⌋;
         return("Success");
     }
  }
  else
  {
     for (i=1; i <= NUM_MODE_SELECTION_ENTRIES_S; i++)
     {
         if (the mobile station supports access mode
             MODE_SELECTION_S[i].ACCESS_MODE)
         {
```

```
        if (MODE_SELECTION_S[i].ACCESS_MODE == '000')
        {
            //d is the duration of the message at rate r in units of 5 ms
            Let r be the desired transmission rate on the R-EACH such that:
                r is a member of the set each_rates,
                d = ⌈1000 × size/r/5⌉, and
                (d >= MODE_SELECTION_S[i].MIN_DURATION) &&
                (d <= MODE_SELECTION_S[i].MAX_DURATION);
        }
        else if (MODE_SELECTION_S[i].ACCESS_MODE == '001')
        {
            // d is the duration of the message at rate r in units of 5 ms
            Let r be the desired transmission rate on the R-CCCH such that:
                r is a member of the set rccch_rates,
                d = ⌈1000 × size/r/5⌉, and
                (d >= MODE_SELECTION_S[i].MIN_DURATION) &&
                (d <= MODE_SELECTION_S[i].MAX_DURATION);
        }
        else return("Failure");
        if (an acceptable value for r exists)
        {
            ACC_MODE_s = MODE_SELECTION_S[i].ACCESS_MODE;
            ACC_RATE_s = r;
            ACC_NUM_BITS_s = the number of information bits that corresponds to r
                according to Table 2-43; //Table 2-41 may be referred to the 3GPP2
                C.S0003 Rev F specification
            ACC_FRAME_DURATION_s = the frame duration that corresponds to r
                according to Table 2-43; //Table 2-41 may be referred to the 3GPP2
                C.S0003 Rev F specification
            ACC_MAX_DURATION_s = MODE_SELECTION_S[i]. MAX_DURATION;
            ACC_MIN_RATE_s = the minimum rate the mobile station supports that is
                greater than or equal to (size/ (MODE_SELECTION_S[i].
                MAX_DURATION × 5));
            ACC_MSG_SIZE = size;
            EACH_NOM_PWR_s=
                MODE_PARMS_s[ACC_MODE_s].EACH_NOM_PWR;
            EACH_INIT_PWR_s= MODE_PARMS_s[ACC_MODE_s].EACH_INIT_PWR;
            EACH_PREAMBLE_ENABLED_s=MODE_PARMS_s[ACC_MODE_s].
                EACH_PREAMBLE_ENABLED;
            EACH_PREAMBLE_NUM_FRAC_s=MODE_PARMS_s[ACC_MODE_s].
                EACH_PREAMBLE_NUM_FRAC;
            EACH_PREAMBLE_FRAC_DURATION_s=
                MODE_PARMS_s[ACC_MODE_s].
                EACH_PREAMBLE_FRAC_DURATION;
            EACH_PREAMBLE_OFF_DURATION_s=
                MODE_PARMS_s[ACC_MODE_s].
                EACH_PREAMBLE_OFF_DURATION;
            NUM_STEP_s = MODE_PARMS_s[ACC_MODE_s].EACH_NUM_STEP;
            EACH_BKOFF_s = MODE_PARMS_s[ACC_MODE_s].EACH_BKOFF;
            EACH_PROBE_BKOFF_s=
                MODE_PARMS_s[ACC_MODE_s].EACH_PROBE_BKOFF;
            EACH_SLOTS_s = MODE_PARMS_s[ACC_MODE_s].EACH_SLOT;
            ACC_RESIDUAL_SIZES_s = ACC_RATE_s × ACC_FRAME_DURATION_s ×
                ⌊(ACC_MAX_DURATION_s × 5)/ACC_FRAME_DURATION_s⌋;
            return("Success");
        }
    }
    return ("Failure");
    }
  }
}
```

It is noted that, the underlined parts of the pseudo-code depict the detailed description of steps S520 to S540 in FIG. 5. The detailed descriptions of the other parts of the pseudo-code are omitted herein since they are beyond the scope of the invention, and reference thereof may be made to the 3GPP2 C.S0003 Rev F specification.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A mobile communication device, comprising:
   a wireless transceiver configured to transmit data to and receive data from a base station via a channel; and
   a controller configured to:
      determine whether a signaling message with data rate information indicating at least first and second data rates supported by the channel has been received from the base station via the wireless transceiver;
      determine whether the mobile communication device supports the second data rate, which is higher than the first data rate,
      transmit data at the first data rate via the wireless transceiver when the data rate signaling message has not been received or the mobile communication device does not support the second data rate; and transmit data at the second data rate via the wireless transceiver when the data rate signaling message with data rate information has been received and the mobile communication device supports the second data rate.

2. The mobile communication device of claim 1, wherein the controller is further configured to:

set a flag to a first value indicating that the signaling message with data rate information has been received and that the mobile communication device supports the second data rate, or set the flag to a second value indicating that the signaling message with data rate information has not been received or that the mobile communication device does not support the second data rate.

3. The mobile communication device of claim 2, wherein the flag is used in a Layer 3 of a communication protocol between the mobile communication device and the base station.

4. The mobile communication device of claim 1, wherein the controller is further configured to:

determine whether the mobile communication device is configured as a Machine-to-Machine (M2M) device;

select the first data rate when the mobile communication device is configured as the M2M device; and select the second data rate when the mobile communication device is not configured as the M2M device.

5. The mobile communication device of claim 1, wherein the controller is further configured to:

determine whether the mobile communication device is data delay tolerant;

select the first data rate when the mobile communication device is data delay tolerant; and select the second data rate when the mobile communication device is not data delay tolerant.

6. The mobile communication device of claim 1, wherein both the mobile communication device and the base station operate in compliance with a communication protocol of the Long Term Evolution technology.

7. A non-transitory computer-readable tangible medium storing instructions that, when executed by a computer, cause the computer to perform a method for performing an access configuration by a mobile communication device configured to communicate with a base station via a channel, comprising:

determining whether a signaling message with data rate information indicating at least first and second data rates supported by the channel has been received from the base station and whether the mobile communication device supports the second data rate, which is higher than the first data rate;

transmitting data at the first data rate via a wireless transceiver when the signaling message with data rate information has not been received or the mobile communication device does not support the second data rate; and transmitting data at the second data rate via the wireless transceiver when the signaling message with data rate information has been received and the mobile communication device supports the second data rate.

8. The non-transitory computer-readable tangible medium of claim 7, further comprising:

setting a flag to a first value indicating that the signaling message with data rate information has been received and that the mobile communication device supports the second data rate, or setting the flag to a second value indicating that the signaling message has not been received or that the mobile communication device does not support the second data rate.

9. The non-transitory computer-readable tangible medium of claim 8, wherein the flag is used in a Layer 3 of a communication protocol between the mobile communication device and the base station.

10. The non-transitory computer-readable tangible medium of claim 7, further comprising:

determining whether the mobile communication device is configured as a Machine-to-Machine (M2M) device; and selecting the first data rate when the mobile communication device is configured as the M2M device; and selecting the second data rate when the mobile communication device is not configured as the M2M device.

11. The non-transitory computer-readable tangible medium of claim 7, further comprising:

determining whether the mobile communication device is data delay tolerant; and selecting the first data rate when the mobile communication device is data delay tolerant; and selecting the second data rate when the mobile communication device is not data delay tolerant.

12. The non-transitory computer-readable tangible medium of claim 7, wherein both of the mobile communication device and the base station operate in compliance with a communication protocol of the Long Term Evolution technology.

13. A base station, comprising:

a wireless transceiver configured to transmit data to and receive data from a mobile communication device via a channel; and a controller configured to broadcast, via the wireless transceiver, a signaling message with data rate information indicating at least first and second data rates are supported by the channel, wherein the second data rate is higher than the first data rate, so as to configure the mobile communication device to transmit or receive data at the first data rate when the mobile communication device is data delay tolerant, and to configure the mobile communication device to transmit or receive data at the second data rate when the mobile communication device is not data delay tolerant.

14. The base station of claim 13, wherein both the mobile communication device and the base station operate in compliance with a communication protocol of the Long Term Evolution technology.

* * * * *